United States Patent

Bodmer et al.

[11] Patent Number: 6,077,549
[45] Date of Patent: *Jun. 20, 2000

[54] PROCESS FOR THE CONTINUOUS PRODUCTION OF BEER

[75] Inventors: Roland Bodmer, Nidderau; Rudolf Bönsch, Nackenheim; Michael Eichelsbacher, Mainz; Peter Mitschke, Maintal; Thorsten Seiffert, Neu-Anspach, all of Germany

[73] Assignee: Metallgesellschaft Aktiengesellschaft, Frankfurt am Main, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/809,167
[22] PCT Filed: Jul. 14, 1995
[86] PCT No.: PCT/EP95/02759
    § 371 Date: Apr. 3, 1997
    § 102(e) Date: Apr. 3, 1997
[87] PCT Pub. No.: WO96/06923

PCT Pub. Date: Mar. 7, 1996

[30] Foreign Application Priority Data

Aug. 31, 1994 [DE] Germany ................... 4430905

[51] Int. Cl.$^7$ ................... C12C 11/07; C12C 11/09
[52] U.S. Cl. ................... 426/16; 426/16; 426/29
[58] Field of Search ................... 426/11, 16, 29, 426/592

[56] References Cited

U.S. PATENT DOCUMENTS 5,762,991  6/1998  Dziodziak et al. ................ 426/11

FOREIGN PATENT DOCUMENTS

94/16054  7/1994  WIPO.

*Primary Examiner*—Curtis E. Sherrer
*Attorney, Agent, or Firm*—Herbert Dubno; Jonathan Myers

[57] ABSTRACT

A process is for the continuous production of beer having a diacetyl content below 0.1 mg/l from a cooked, unfermented, fermentable wort with an oxygen content of 0.5 to 3.0 mg $O_2$ per liter.

3 Claims, 1 Drawing Sheet

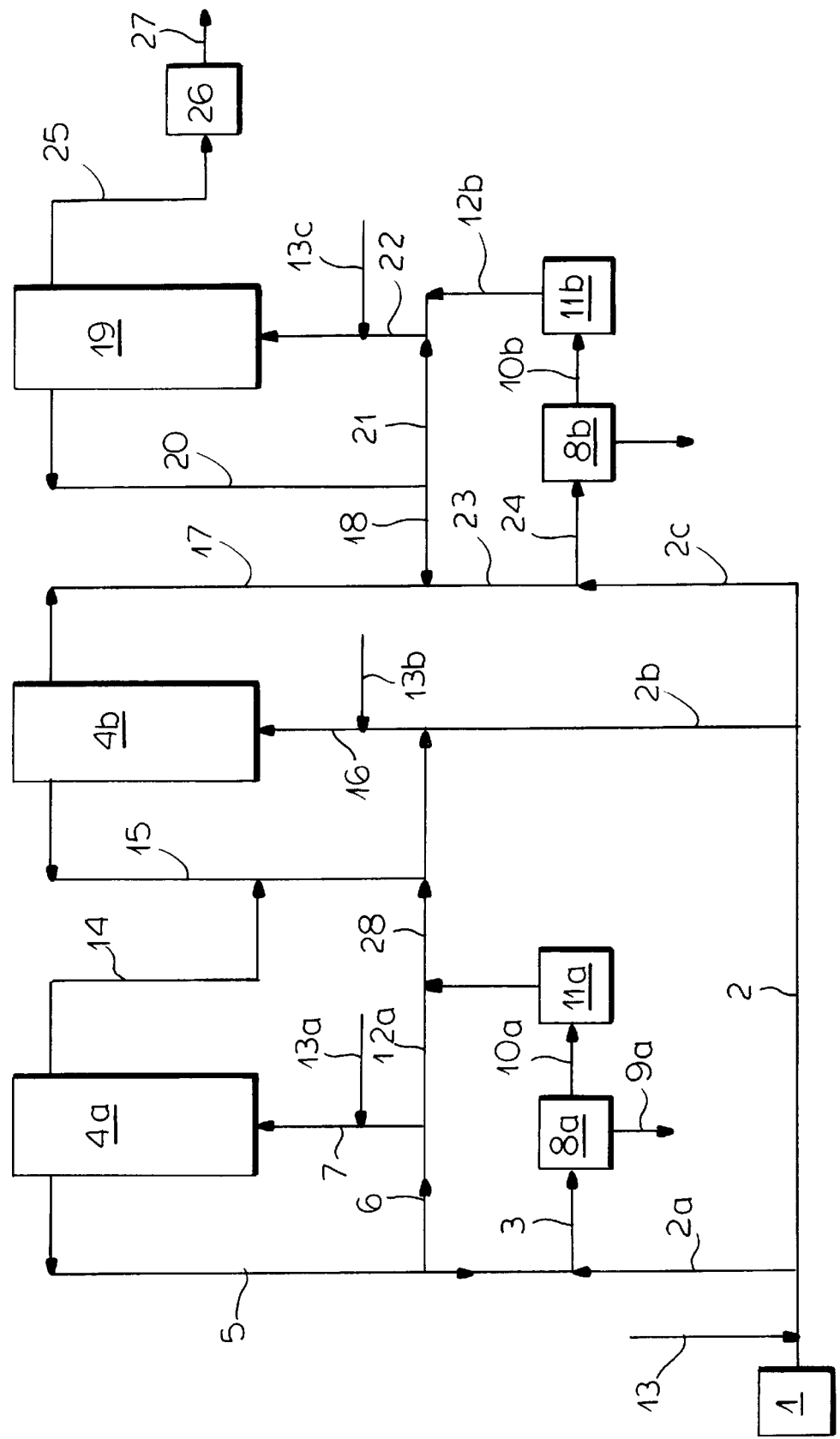

PROCESS FOR THE CONTINUOUS PRODUCTION OF BEER

FIELD OF THE INVENTION

This invention relates to a process for the continuous production of beer, in which the wort with an oxygen content of 0.5 to 3.0 mg $O_2$ per liter is continuously supplied to at least one fermenter designed as a loop reactor operating at a temperature of 6 to 25° C. and a pressure of 1.5 to 2 bar, in which the wort has an average dwell time of 4 to 40 hours. There is a biocatalyst containing a biologically active yeast, and a partial stream of the wort is continuously circulated, where from the circulating partial stream of the wort the free yeast cells are separated and the yeast-free partial stream is then heated to 60 to 90° C. for 0.5 to 30 minutes and subsequently cooled, before it is again supplied to the fermenter.

BACKGROUND OF THE INVENTION

From the DE-PS 42 44 595 a process for the continuous production of beer is known, where starch-containing raw materials are mashed with water, and the mash is continuously supplied to at least one reactor. Through indirect heat exchange the temperature of the mash before addition to the individual reactors is gradually raised to a final temperature of 75 to 85° C. The dwell time in the reactors is 30 to 90 minutes, and the mash in the individual reactors is kept at a defined temperature level. The grains are continuously separated from the mash in a decanter and are subsequently leached out with the brewing water in a two-stage decanter. The hot wort is mixed with hop or hop extract and is continuously supplied to a flow reactor and heated to a temperature of 105 to 140° C. During the passage through the reactor for 2 to 60 minutes the wort is maintained at this temperature and a pressure of 1.2 to 3.6 bar. The pressurized wort is subjected to a flash evaporation, continuously liberated from the turbid matter in a separator and then cooled to the fermentation temperature in a heat exchanger. The cooled wort with an oxygen content of 0.5 to 3.0 mg $O_2$ per liter is continuously supplied to at least one fermenter designed as a loop reactor operating at a temperature of 6 to 25° C. and a pressure of 1.5 to 2 bar, in which the wort has an average dwell time of 10 to 40 hours and is continuously circulated. There is a biocatalyst containing a biologically active yeast, where during the fermentation, liquid medium is continuously withdrawn from the fermenter and is centrifuged for removing the free yeast cells contained therein. The yeast-free liquid medium is heated to 60 to 90° C. for 0.5 to 30 minutes and is subsequently cooled by expansion, where a partial stream is recirculated to the fermenter, and the second partial stream is discharged as finished product after a filtration.

In the execution of this process it has turned out in some cases that the taste quality of the beer has yet to be improved, which is due to the fact that the separation of the diacetyl formed through thermal conversion of a-acetolactate can not always be achieved almost quantitatively by means of the heat treatment, expansion and partial recirculation of the finished product to the fermentation provided in accordance with the known process. Thus, the object of the present invention is the improvement of the taste quality of continuously produced beers, in particular by lowering their diacetyl content.

A taste improvement through conversion of the byproducts formed during the primary fermentation is usually effected during the storage of the young beer referred to as maturation, which is performed for some weeks at low temperatures. Such storage requires corresponding storage rooms and stock-keeping. Therefore, tests on the fast maturation of beer have already been carried out. From the DE-PS 41 37 474 a process is known for the continuous fast maturation of beer through further conversion of the wort treated in the primary fermentation step with yeast on a carrier. The conversion is performed at an elevated pressure in a fluidized-bed reactor with yeast immobilized on macroporous granulate having a porosity of 40 to 65% with pore sizes of 60 to 300 $\mu$m and a particle size $\leq$ 3 mm. As carrier macroporous glass granulate with a particle size of 1 to 2 mm is used and temperatures of 2 to 10° C. as well as dwell times of 5 to 15 hours are employed. Furthermore, from the DE-PS 24 29 574 a process is known for the continuous production of beer comprising a fermentation of the beer wort while flowing through a fermenter. The wort is passed through a fermentation tower containing yeast which is disposed on a carrier consisting of diatoms or granular polyvinylchloride. The young beer coming from the fermentation tower is passed through a storage tower, which corresponding to the fermentation tower has a yeast-containing carrier, and where the beer coming from the storage tower is passed through a treatment tower which has proteases on a carrier of organic polymers, bricks, silica, glass, sand, silica-based compounds or clay-containing substances.

OBJECT OF THE INVENTION

The object underlying the present invention is to create a process for the continuous production of beer, which has the features stated above, and by means of which matured beer can be produced over a long period, which beer has a constant high quality of taste, and whose diacetyl content is always below 0.1 mg per liter, preferably below 0.05 mg per liter.

SUMMARY OF THE INVENTION

The object underlying the invention is solved in that the entire outlet of the fermenter is supplied continuously to a maturing fermenter designed as a loop reactor, into which in addition 1 to 8% of the wort supplied to the fermenter are introduced continuously, which operates at a temperature of 10 to 20° C., in which the medium to be matured has an average dwell time of 4 to 30 hours, which is operated with the biocatalyst, which is used in the fermenter and in which a partial stream of the medium to be matured is constantly circulated. From the circulating partial stream of the medium to be matured the free yeast cells are separated and the yeast-free partial stream is then heated to 60 to 70° C. for 0.5 to 30 minutes and is subsequently cooled before again reaching the maturing fermenter, and that the entire outlet of the maturing fermenter is filtered and discharged as finished product. Due to the separation of fermentation and maturation provided in accordance with the invention as well as due to the addition of 1 to 8% of the unfermented wort supplied to the fermenter into the maturing fermenter, the maturation process is advantageously influenced such that in general a diacetyl content of <0.05 mg per liter is found in the finished product, where the diacetyl content in the finished product is largely constant over an extended period and only in exceptional cases reaches the diacetyl limit value of 0.1 mg per liter. This process result can reliably be maintained in a continuous operation.

In accordance with a further aspect of the invention the entire outlet of the fermenter is admixed with the partial stream of the maturing medium of the maturing fermenter, before this partial stream is liberated from yeast and heated. In this way, the yeast-removal of the outlet of the fermenter is inexpensively combined with the yeast-removal of the circulating partial stream of the maturing fermenter.

In accordance with a further aspect of the invention two fermenters are employed, where to the first fermenter 75 to 90% and to the second fermenter 5 to 20% of the wort are supplied. The fermentation process is advantageously influenced by this process in that the outlet of the second fermenter supplied to the maturing fermenter already has a relatively low diacetyl content. In the inventive distribution of the wort to the first and second fermenter it should be noted that 1 to 8% of the entire wort to be fermented is in any case introduced into the maturing fermenter.

In accordance with a further aspect of the invention the biocatalyst finally has a $TiO_2$ content of 5 to 30 wt-% and contains a biologically active yeast and a gel-like matrix, where the $TiO_2$ particles have a diameter of 0.1 to 1 μm and the catalyst is spherical. This catalyst is described in DE-PS 37 04 478, and it has the advantage that it can be evenly distributed in the fluidized bed of the fermenters, has good mechanical strength properties and merely contains substances of natural origin, which show an inert behavior in chemical or biological reaction systems. The biocatalyst is also particularly suited for executing the continuous maturation process.

In accordance with the invention it has turned out to be particularly advantageous when the wort supplied to the maturing fermenter has an oxygen content of 0.5 to 3 mg $O_2$ per liter, as with this oxygen content the biocatalyst is permanently kept in an optimum state of nourishment with respect to the yeast, and the wort present during maturation will ferment almost quantitatively and reliably lower the diacetyl content to the desired low value.

BRIEF DESCRIPTION OF THE DRAWINGS

The subject-matter of the invention will subsequently be explained in detail with reference to the drawing drawing, the sole FIGURE in this application which is a flow chart describing the process.

DETAILED DESCRIPTION OF THE DRAWINGS

The storage tank 1 contains the hopped, cooked, fermentable wort, which is free from turbid matter and has been sterilized. At a temperature of about 15° C. the wort is continuously supplied from the storage tank 1 into the main line 2, where it is first of all mixed with the air contained in the line 13, so that it has an oxygen content of 1.5 to 1.7 mg $O_2/1$ wort, and where it is subsequently divided into three partial streams flowing off via lines 2a, 2b and 2c. The $O_2$-containing wort stream (100%) contained in line 2 is delivered into line 2a for 80%, into line 2b for 15% and into line 2c for 5%.

From line 2a the wort is continuously supplied into line 3, where it is mixed with a partial stream of the substrate, which is partially discharged from the first fermenter 4a via line 5. The second partial stream of the substrate flowing in line 5 reaches the fermenter 4a via lines 6 and 7, so that there is maintained an internal circulation in the first fermenter 4a. The mixture consisting of wort and a partial stream of the substrate of the first fermenter 4a is supplied via line 3 to the separator 8a in which the free yeast cells are separated, which are contained in the substrate of the first fermenter 4a. The yeast cells are discharged from the separator 8a via line 9a, while the yeast-free mixture is supplied to a heat treatment unit 11a via line 10a. The heat treatment unit 11a consists of a short-time heater, in which the yeast-free mixture is heated to a temperature of about 65° C., of a holding device, in which the heated mixture is maintained at the temperature of 65° C. for about 30 minutes, and of a heat exchanger, in which the mixture is cooled to the fermentation temperature of about 15° C. In the separator 8a and in the heat treatment unit 11a there are no oxygen losses due to a leakage of oxygen from the system into the atmosphere. Via line 12a the cooled mixture flows to line 7, where it is mixed with the second partial stream of the substrate of the first fermenter 4a flowing in line 6. Line 13a, through which air can be added if necessary, opens into line 7.

The medium to be fermented, which enters the first fermenter 4a via line 7, has an average dwell time of 5 hours in this fermenter. The temperature in the first fermenter 4a lies at an almost constant value of 15° C.

The partially fermented medium is discharged from the first fermenter 4a via line 14 and is admixed with the substrate of the second fermenter 4b, which via lines 15 and 16 partially flows back into the second fermenter 4b, so that in the second fermenter 4b as well an internal substrate circulation is maintained. The second partial stream of the wort contained in line 2b is mixed in line 16 with the substrate of the second fermenter 4b circulating in line 15, into which line 16 line 13b opens as well, through which air can be added if necessary. In the second fermenter 4b the medium to be fermented has an average dwell time of 5 hours. The fermented substrate leaves the second fermenter 4b via line 17.

To the fermented medium contained in line 17 a partial stream of the substrate of the maturing fermenter 19 is admixed via line 18, which substrate partly flows in line 20. The second partial stream of the substrate contained in line 20 again reaches the maturing fermenter 19 via lines 21 and 22, so that in the maturing fermenter 19 there is also maintained an internal circulation of the substrate. The mixture consisting of the fermented medium and of the first partial stream of the substrate of the maturing fermenter 19 is delivered via line 23 to line 24, into which there is also introduced the third partial stream of the wort from line 2c. The mixture consisting of the fermented medium, the third partial stream of the wort and the first partial stream of the substrate of the maturing fermenter 19 is delivered from line 24 to the separator 8b, where the free yeast cells are separated, which are contained in the fermented medium and in the first partial stream of the substrate of the maturing fermenter 19. The free yeast cells are discharged from the separator 8b via line 9b and can be combined with the yeast cells discharged via line 9a and be discarded from the process. The yeast-free mixture is delivered via line 10b to the heat treatment unit 11b, which corresponding to the heat treatment unit 11a consists of a short-time heater, a holding device and a heat exchanger, where the mixture is heated to 65° C. in the shorttime heater and is maintained at this temperature for 30 minutes in the holding device, and where the mixture is cooled in the heat exchanger to the maturation temperature of about 12° C. The cooled mixture is delivered via line 12b to line 22, where it is mixed with the second partial stream of the circulating substrate of the maturing fermenter 19. The medium to be matured, which is contained in line 22, can be mixed with air if necessary, which air is introduced into line 22 via line 13c. The medium to be matured, which is contained in line 22, has an average dwell time of 5 hours in the maturing fermenter 19, where the maturation temperature is about 120° C.

The matured medium is continuously discharged from the maturing fermenter via line 25 and reaches the filter 26, which employs a known filtration aid, and in which the residual free yeast cells are separated. The finished product is continuously discharged via line 27.

When in the storage tank 1 there is still separated cold sludge, the same is largely separated in the separators 8a and 8b together with the free yeast cells. If it is necessary to also separate cold sludge from the second partial stream of the wort, this can be effected such that line 2b is closed, and the first and the second partial stream of the wort together are delivered via lines 2a and 3 into the separator 8a, and that a partial stream of the mixture contained in line 12a is introduced into line 15 via line 28, where it should be ensured that the required amount of wort is supplied to the second fermenter 4b; in the present case, the partial stream contained in line 28 should be dimensioned such that it contains 15% of the entire wort.

We claim:

1. A method of continuously making beer from wort comprising the steps of:

(a) aerating a fresh stream of wort to get an oxygen content in the wort of 0.5 to 3.0 $O_2$ per liter, dividing said fresh stream of wort into a first, a second and a third partial stream of wort;

(b) feeding said first partial stream of wort into a first fermenter, recirculating a yeast-containing liquid phase through said first fermenter, and withdrawing a fermented liquid phase from said first fermenter;

(c) feeding said second partial stream of wort into a second fermenter together with fermented liquid phase withdrawn from said first fermenter, recirculating a yeast-containing liquid phase through said second fermenter, and withdrawing a fermented liquid phase from said second fermenter;

(d) feeding said third partial stream of wort into a maturing fermenter, recirculating a yeast-containing liquid phase through said maturing fermenter, and withdrawing a fermented liquid phase from said maturing fermenter, each of said first, second and maturing fermenter containing a fermenting biocatalyst containing biologically active yeast cells;

(e) in a path of the withdrawn liquid phase from said first fermenter, removing free yeast cells by centrifugation and successively heating said liquid phase to 60 to 90° C. for 0.5 to 30 minutes and then cooling the liquid phase along said path;

(f) forming a liquid mixture of withdrawn liquid phase from said maturing fermenter and the whole fermented liquid phase from said second fermenter, removing free yeast cells from said liquid mixture by centrifugation and successively heating the liquid mixture to 60 to 70° C. for 0.5 to 30 minutes and then cooling the liquid mixture and feeding it into said maturing fermenter; and (g) filtering yeast cells from the fermented liquid phase withdrawn from said maturing fermenter to yield beer as a product.

2. The process defined in claim 1 wherein the first partial stream of wort amounts to 75 to 90% of the fresh stream of wort, the second partial stream of wort amounts to about 5 to 20% of the fresh stream of wort, and the third partial stream of wort amounts to 1 to 8% of the fresh stream of wort; the first, second and maturing fermenter operating at temperatures in the range of 6 to 25° C. and pressures of 1.5 to 2 bar.

3. The process defined in claim 1 wherein according to step (d) the biocatalyst containing biologically active yeast cells has a $TiO_2$ content of 5 to 30 weight % and contains a biologically active yeast and a gel-like matrix, where the $TiO_2$ particles have a diameter of 0.1 to 1 $\mu$m and the catalyst is spherical.

* * * * *